US008142604B2

(12) United States Patent
Rehkugler et al.

(10) Patent No.: US 8,142,604 B2
(45) Date of Patent: Mar. 27, 2012

(54) LABELING METHOD

(75) Inventors: Richard A. Rehkugler, Fairport, NY (US); James A. Johnson, Jr., Canandaigua, NY (US); Daniel L. Hinman, Farmington, NY (US); Jo Ann H. Squier, Bloomfield, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 253 days.

(21) Appl. No.: 12/254,936

(22) Filed: Oct. 21, 2008

(65) Prior Publication Data

US 2009/0133831 A1 May 28, 2009

Related U.S. Application Data

(60) Provisional application No. 60/990,154, filed on Nov. 26, 2007.

(51) Int. Cl.
*B32B 37/00* (2006.01)
*B29C 65/00* (2006.01)

(52) U.S. Cl. ............ 156/308.6; 156/324.4; 156/DIG. 9; 156/DIG. 35; 156/DIG. 50

(58) Field of Classification Search ............... 156/308.6, 156/308.8, DIG. 6, 9, 11, 13, 34, 35, 50, 156/215, 230, 324.4, 578
See application file for complete search history.

(56) References Cited

U.S. PATENT DOCUMENTS

| | | | | |
|---|---|---|---|---|
| 4,203,798 | A | 5/1980 | Yamashita | |
| 4,347,095 | A | 8/1982 | Yamashita | |
| 4,693,210 | A * | 9/1987 | DiFrank | 118/259 |
| 5,045,140 | A | 9/1991 | Dickey | |
| 5,512,352 | A * | 4/1996 | Haig | 428/195.1 |
| 2003/0099827 | A1 | 5/2003 | Shih et al. | |
| 2004/0200566 | A1 | 10/2004 | Bellafore et al. | |
| 2007/0119542 | A1 | 5/2007 | Williams et al. | |
| 2008/0226907 | A1 * | 9/2008 | Suhner | 428/355 CP |

FOREIGN PATENT DOCUMENTS

| | | | |
|---|---|---|---|
| DE | 202 20 132 | | 4/2004 |
| EP | 0 159 286 | | 10/1985 |
| EP | 1690795 | A1 * | 8/2006 |
| JP | 08133249 | A * | 5/1996 |

OTHER PUBLICATIONS

Machine translation of EP 159286 date unknown.*

* cited by examiner

*Primary Examiner* — John Goff
(74) *Attorney, Agent, or Firm* — Kevin M. Faulkner; Darryl M. Tyus; Xiaobing Feng

(57) ABSTRACT

A method useful for applying labels to a container, the labels having an activatable adhesive coating on a surface thereon, the adhesive is activated by contact with a low viscosity activator solution from an apparatus comprising at least a label pallet that receives a low viscosity activator solution by contact with a spinning roller, the spinning roller receives at least one stream of the low viscosity activator solution delivered or sprayed by a fluid manifold.

7 Claims, 7 Drawing Sheets

LABELING METHOD

CROSS-REFERENCE TO RELATED APPLICATIONS

This application claims priority to application Ser. No. 60/990,154 filed Nov. 26, 2007, which is hereby incorporated by reference.

FIELD OF INVENTION

This invention relates to a method and apparatus useful for applying labels to a container, the labels having an activatable adhesive coating on a surface thereof The activatable adhesive is activated by contact with a low viscosity activator solution supplied by an apparatus comprising at least a label pallet, a spinning roller, and a fluid manifold.

BACKGROUND OF THE INVENTION

A number of systems exist for applying labels to containers. A typical system may utilize either roll-fed labels or cut-and-stack labels. Other systems are also known, but may be viewed generally as variations on the two primary systems.

Prior art labeling apparatus and methods employing labels in roll-fed form may also include label cutting and registration means for severing discrete labels from the roll and then registering them for attachment to the containers through, for example, a vacuum transfer drive system. In these continuous application systems, an adhesive may be applied to the label, such as a hot-melt adhesive. The hot-melt adhesive is typically applied to both the leading and trailing edge of the backside of the labels, though it may also be applied to the entire backside, for attaching labels to containers. Roll-fed labeling systems may commonly be used to apply labels sequentially to containers, such as bottles, tubs, or jars, in a continuous label application system.

As one alternative, cut-and-stack labels, i.e., labels that have been pre-cut off-line and are retained or positioned in a stack within a dispenser, such as a label magazine, may also be applied sequentially to containers, such as bottles, tubs, or jars, in a continuous label application system. The cut-and-stack method may also employ a cold-glue adhesive, which may be water-soluble, though a hot-melt adhesive may also be used. When a cold-glue adhesive is employed in a cut-and-stack method, it may be applied to a label pallet by a roller application system including a spinning roller made of, for example, steel and/or having a surface made of rubber. A label pallet may be moved into contact with the first or exposed label of the stack to both apply the cold-glue to that label and remove the label from the stack through surface adhesion between the label and the relatively high viscosity and/or tacky adhesive. Thereafter, the label, with the cold-glue adhesive thereon, may be moved to a transfer drum, from which it may then be applied to a container, such as, for example, a bottle.

In one aspect of present labeling technology using high viscosity adhesives, the adhesive may be applied to the label by pumping the adhesive onto a spinning glue roller, the adhesive on the spinning roller is then wiped by a doctor blade to remove excess adhesive. A label pallet contacts the adhesive on the spinning glue roller, thus splitting the adhesive between the spinning glue roller and the label pallet. Cut-and-stack labeling systems typically use a relatively high viscosity adhesive, such as, for example, a cold glue adhesive. Roll-fed systems employing hot-melt adhesives also include relatively high viscosity adhesive. The viscosity of such high viscosity cold glue adhesives and hot-melt adhesives are often greater than about 30,000 to 50,000 centipoise.

Due to the viscosity of the adhesive, when the label pallet contacts the spinning glue roller to transfer the adhesive from the spinning glue roller to the label pallet, a pattern may commonly be generated on the surface of the label pallet due to varying concentrations of adhesive across the label pallet surface and resulting from the cohesive split of the adhesive between the label pallet and the spinning roller. This so-called "transfer splitting pattern" may be further passed to the label when the label is peeled from the label pallet. A typical transfer splitting pattern may include a series of non-uniform peaks and valleys, and may result in uneven glue adhesion between label and container and impaired appearance. Uneven adhesion between label and container may result in (i) poor label adhesion to the container, (ii) a non-uniform label appearance, and (iii) an easily identifiable interface between label and container. The transfer split pattern may be transferred to the label when the label is removed from the label pallet and then transferred to the container.

Under an opaque label, the pattern or other visual imperfections may not be of significant concern, unless the appearance is manifest through the container wall, such as with clear containers, or if it appears on the surface of the label. However, under a transparent or clear label, the split-transfer adhesive pattern may notoriously appear through the label or otherwise impair the appearance of the labeled container. This problem may be particularly noticeable when trying to achieve a no-label look.

To address this problem, labeling technology has turned to two-part cold glue adhesives in which the labels comprise an activatable adhesive coating or layer on a surface of the label. The components of the activatable adhesive may constitute the high viscosity components of a traditional adhesive system, such as a cold glue system. These components are incorporated onto a surface, often a backside surface, of a label. Such components are dried, when necessary, and form an activatable adhesive coating or layer. Thereafter, a low viscosity activator solution is applied to the activatable adhesive label to activate the adhesive. The activated adhesive on the label is applied to a container while the adhesive is still tacky to the touch.

These low viscosity activator solutions may preferably constitute a solution that is relatively lower in viscosity as compared to an adhesive compound, such that the low viscosity activator solution may relatively easily be applied to the activatable adhesive on a surface of the film by spraying, to activate the adhesive. When such activated labels are applied to containers the appearance of the adhesive pattern on a labeled container is reduced.

These low viscosity activator solutions have a viscosity in the range from 5 to 1000; preferably from 5 to 500; more preferably from 5 to 100 centipoise.

Current labeling lines that use high viscosity adhesives are not capable of utilizing the low viscosity activator solutions. The need exists to retrofit the label application stations used for high viscosity adhesives in order to incorporate such lower viscosity activator solution. Such retrofit should be low in cost, easy to implement, and should require minimal to no change to existing labeling equipment. The present invention meets these and other needs.

SUMMARY OF THE INVENTION

In one aspect, the invention features a method for applying a label to a container, in which the label has an activatable adhesive on a surface thereof. The activatable adhesive is activated by a low viscosity activator solution. The label may be made of a polymeric film or paper. In this method, a low viscosity activator solution is supplied to a fluid manifold. The fluid manifold continuously delivers or sprays at least one stream of the low viscosity activator solution to at least a portion of a surface of a spinning roller, preferably to achieve a uniform distribution of the low viscosity activator solution on the spinning roller. The spinning roller is contacted with a label pallet to transfer at least a portion of the low viscosity activator solution from the surface of the spinning roller to a label pallet. The low viscosity activator solution on the label pallet is contacted or engaged with the activatable adhesive on the label to wet and activate the activatable adhesive on the label. After activation, the now adhesive label is thereafter adhered to a container by placing the activated coating or layer of the label in contact with a surface of the container.

In one embodiment, the fluid manifold comprises an inlet, a liquid conduit and at least one discharge port, preferably a plurality of discharge ports, wherein the at least one discharge port is in fluid communication with the liquid conduit and the inlet. The low viscosity activator solution is supplied to the inlet of the fluid manifold by a supply pump at a pressure sufficient to deliver the stream or spray of the low viscosity activator solution to the surface of the spinning roller. The liquid conduit and the at least one discharge port are structured in combination to deliver at least one stream of the low viscosity activator solution to the spinning roller at the pressure supplied by the supply pump.

In some embodiments, the method of the invention features the step of adjusting an amount of the low viscosity activator solution on the spinning roller with a doctor blade. The doctor blade contacts the amount of low viscosity activator solution on the surface of the spinning roller to control the amount of the low viscosity activator solution on the spinning roller.

In another aspect, the invention features an apparatus for continuously supplying a low viscosity activator solution to an activatable adhesive on a surface of a label. In one aspect, the apparatus generally includes (a) the fluid manifold, described above, that is adapted to continuously deliver or spray at least one stream of a low viscosity activator solution; (b) the spinning roller having a spinning roller surface adapted to receive the stream of the low viscosity activator solution; and (c) the label pallet having a label pallet surface adapted to transfer a portion of the low viscosity activator solution from the spinning roller surface to the activatable adhesive on the surface of the label.

In some embodiments, the apparatus features the doctor blade, described above, in contact with an amount of the low viscosity activator solution on the spinning roller, and adapted to control the amount of the low viscosity activator solution on the spinning roller.

In some embodiments, the apparatus of the invention features a mounting bracket attached to the fluid manifold and adapted to adjustably position the fluid manifold to spray the low viscosity activator solution stream on the spinning pallet. The fluid manifold is adjustably positioned by the mounting bracket in at least one of a vertical distance, a horizon distance or an angular distance relative to the spinning roller.

In another aspect, the invention features a method for retrofitting a high viscosity cold glue supply apparatus to continuously supply a low viscosity activator solution to an activatable adhesive on a surface of a label. The method comprising the steps of: (a) installing a fluid manifold adapted to deliver or spray at least one stream of the low viscosity activator solution to a spinning roller, the low viscosity activator solution having a viscosity in a range of 5 to 1000 centipoise; and (b) providing a supply pump adapted to supply the low viscosity activator solution to an inlet of the fluid manifold at a pressure sufficient to deliver the stream of the low viscosity activator solution to the surface of the spinning roller, a spinning roller adapted to receive the stream of the low viscosity activator solution from the fluid manifold, and a label pallet adapted to transfer a portion of the low viscosity activator solution from the spinning roller to the activatable adhesive on the label.

In still another aspect, the invention features an improvement in an apparatus for continuously supplying a low viscosity activator solution to an activatable adhesive on a surface of a label, the low viscosity activator solution activates the activatable adhesive, the apparatus comprising a supply pump adapted to supply the low viscosity activator solution at a pressure sufficient to deliver the stream of the low viscosity activator solution to the surface of the spinning roller, a spinning roller adapted to receive the low viscosity activator solution, a label pallet adapted to transfer a portion of the low viscosity activator solution from the spinning roller to the activatable adhesive on the label, the improvement comprising:

a fluid manifold having an inlet, a liquid conduit and at least one discharge port in fluid communication with the low viscosity activator solution, the liquid conduit and the at least one discharge port are structured in combination to deliver or spray at least one stream of the low viscosity activator solution to the spinning roller at the pressure supplied by the supply pump.

DETAILED DESCRIPTION OF THE INVENTION

Figure 1:
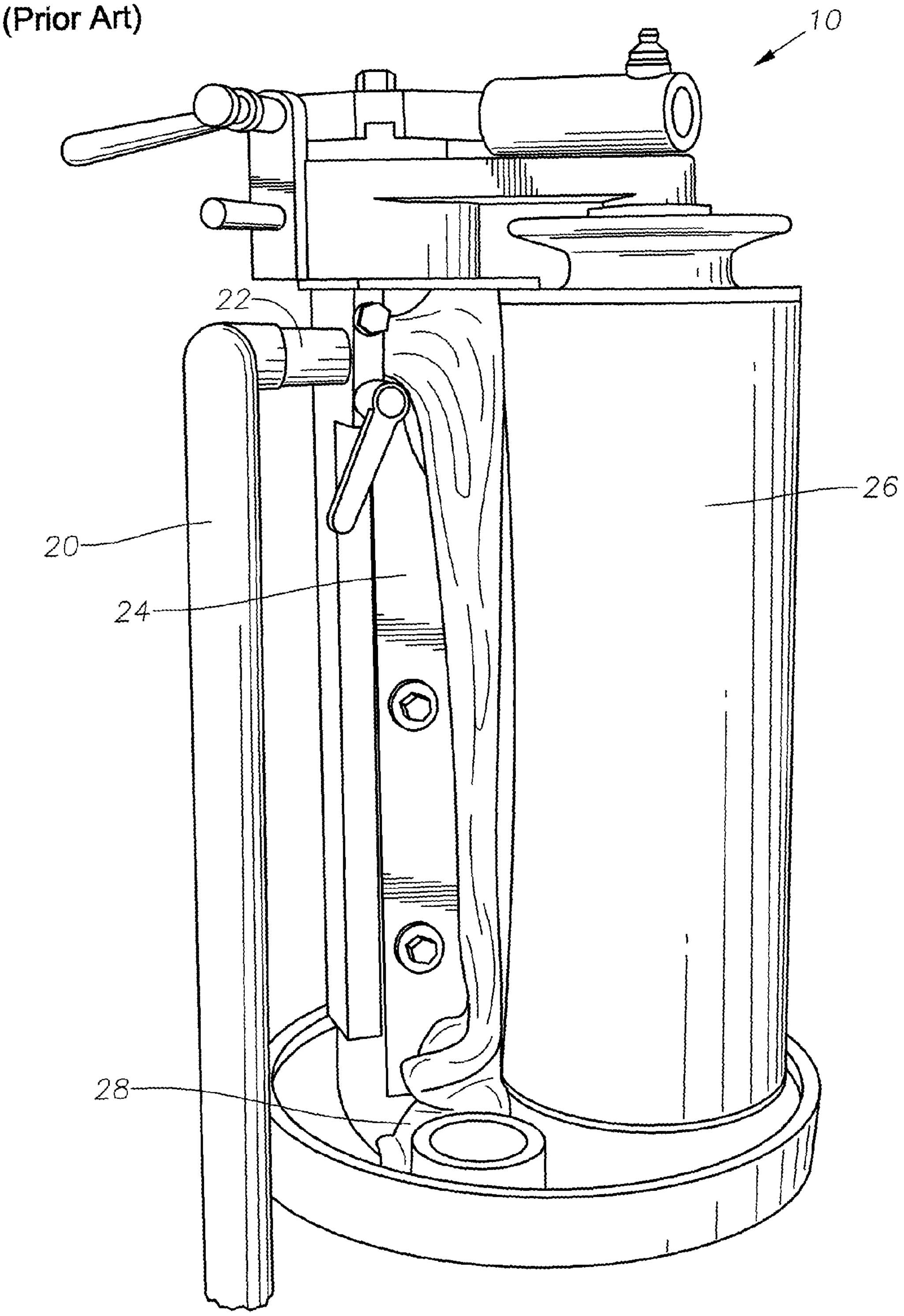
Fig. 1 (Prior Art)
FIG. 1 illustrates a prior art apparatus for application of a high viscosity adhesive, such as a cold glue, to a spinning roller.

As used herein, the terms "spray", "spraying," "sprayer," and "sprayed" may be defined broadly as encompassing all forms of spraying and sprayers, suitable for delivering a continuous stream or volume of a low viscosity activator solution through a spatial medium, to a surface of a spinning roller, including, but not limited to, atomizing and atomizers, misting and misters, fogging and foggers, and spraying and sprayers, and other forms of controlled or metered streams. Furthermore, the term "spraying" refers to any method or system for delivering, applying, diffusing, or otherwise distributing multiple droplets of liquid through or into an atmosphere.

As used herein, the term "wet-out" refers to the wetting of a solid surface or tendency to spread on a solid surface, by a liquid or solution, wherein the term "wetting" refers to the interfacial free energy when a liquid is placed in contact with a solid surface.

As used herein, the term "continuously" in reference to "continuously applying labels" refers to the fact that each of the methods and apparatuses for applying labels to containers may be used as part of a system for applying labels to containers, typically at a rate of 10 containers/minute or more. For example, in some embodiments, a method and/or apparatus for applying labels to containers may be used as part of a system for applying a label to a wine or spirit container at a rate of over 50 containers/minute, and in some preferred embodiments, at a rate of over 100 containers/minute. In other embodiments, the method and/or apparatus for applying labels to containers may be used as part of a mechanical system for applying a label to a beer, juice, soft drink or water container at a rate of over 500 containers/minute, and in other preferred embodiments, at a rate of over 800 containers/minute. The methods and apparatus for applying labels to containers may be employed in substantially any system for applying labels to containers, including but not limited to, systems employing cut-and-stack labels and systems employing labels in roll-fed form.

The methods and apparatus of the present invention are applicable to labels, such as polymeric and/or paper labels, that contain an activatable adhesive coating or layer on an exterior surface of the label. The activatable adhesive contains the adhesive or components of the adhesive mixture used, at least in part, to adhere the label to the container. The activatable adhesive is activatable by contacting the activatable adhesive with a low viscosity activator solution substantially immediately before the label is to be applied to the container. The viscosity of many commonly used labeling adhesives, such as cold glue adhesives or hot-melt adhesives, having viscosities greater than about 30,000 to 50,000 centipoise, may be too high to permit efficiently and effectively spraying the solution onto the label. This invention involves applying an adhesive component to the label and drying that component before the label is activated for adhesion to the container. Thereafter, when it is desired to apply the label to the container, a lower viscosity, efficiently sprayable component of the adhesive system can be sprayed onto the adhesive layer of the label. The relatively lower viscosity composition that is sprayable may be referred to as the "low viscosity activator solution," regardless of the interaction between the low viscosity activator solution and the activatable adhesive, e.g., whether by rehydration and/or chemical interaction. The viscosity of the low viscosity activator solution suitable for this invention has a viscosity in the range from 5 to 1000; preferably from 5 to 500; more preferably from 5 to 100 centipoise.

This invention comprises, generally, a method for continuously applying labels to containers; a method for retrofitting a high viscosity cold glue supply apparatus to continuously supply a low viscosity adhesive activator solution to an activatable adhesive on a surface of a label; and an apparatus which may be used for these methods which comprises, inter alia, a fluid manifold adapted to deliver or spray at least one stream of a low viscosity adhesive activator solution, the fluid manifold comprising an inlet, a liquid conduit, and at least one discharge port, wherein the discharge port is in fluid communication with the liquid conduit, that may be used with one or more embodiments of the apparatus and methods of this invention.

In a method for applying labels to containers according to this invention, the label has an activatable adhesive on a surface thereof, in which the activatable adhesive is activated by a low viscosity activator solution, the method comprising the steps of: (a) supplying the low viscosity activator solution to a fluid manifold; (b) continuously delivering or spraying at least one stream of the low viscosity activator solution with the fluid manifold to wet-out at least a portion of a surface of a spinning roller; (c) transferring at least a portion of the low viscosity activator solution from the surface of the spinning roller to a label pallet; (d) contacting the activatable adhesive on the label with the low viscosity activator solution on the label pallet to activate the activatable adhesive on the label and produce an adhesive label; and (e) thereafter, applying the adhesive label to the container.

The label may be positioned to receive the low viscosity activator solution from the label pallet, the label including an activatable adhesive on a surface of the label. The terms "position" or "positioned" are used broadly to encompass substantially any means of supporting, holding, or providing a label for repositioning or contacting a container or other component. The term "label dispenser" is also used broadly to mean and include substantially any apparatus or magazine for supporting, positioning, providing, holding, or manipulating one or more labels, including a stack or roll of labels.

The method also comprising the step of contacting the low viscosity activator solution on the label pallet with the activatable adhesive of the label to activate the activatable adhesive on the label. Due to substantially uniform application of the stream of the low viscosity activator solution and the relatively lower viscosity and adhesive properties of the low viscosity activator solution, the activated label may possess an adhesive surface that has improved uniformity of thickness, as compared to prior art high viscosity liquid-adhesive-based labeling systems such those using hot or cold glue adhesive. Additionally, the separation of the activatable label surface from the label pallet may have reduced propensity toward producing a transfer splitting pattern as compared to the prior art systems. The low viscosity activator solution should be of sufficiently low viscosity to be sprayable and of sufficiently low surface tension as compared to the surface energy of the spinning roller to wet-out and substantially, uniformly cover the surface of the spinning roller. It is also desirable that the surface tension of the low viscosity activator solution be lower than the surface energy of the activatable adhesive of the label to enhance uniform distribution of the low viscosity activator solution on the activatable adhesive after separation of the activatable adhesive and the label pallet.

According to some preferred methods, the releasably adhered label may be removed from the label dispenser by the label pallet, to the container. If desired, the activated label may be removed from the label pallet by a mechanism, such as a set of mechanical fingers, and adhered to the surface of the container. As for the apparatus and methods for manipulating and engaging each of the fluid manifold, the low viscosity activator solution, the spinning roller, the label pallet, the label, and the container to be labeled, each or any of such components may be manipulated relative to the other components, as desired, to complete transfer of the low viscosity activator solution from the fluid manifold, to the spinning roller, to the label pallet, to the label and finally to the container/label interface.

For example, the label pallet may be supported on a reciprocating member wherein the label pallet reciprocates along a repeating course. The term “reciprocating” as used herein may be defined broadly to include substantially any movement mechanism for any or all of these components, including, without limitation, at least one of (1) a rotating member, (2) a conveyor member, and/or (3) an extending and retracting member, such as a linkage and/or cam device. It is merely necessary that the dynamic components(s) move along an automated or repeating course to facilitate repeatability of a substantially continuous labeling operation.

For example, the label pallet may be moved to contact the low viscosity activator solution on the spinning roller to transfer at least a portion of the low viscosity activator solution from the spinning roller to the label pallet. In addition, the container may be moved to cause the surface of the container to contact the activated layer of the label. To ensure that the low viscosity activator solution spreads and wets-out properly on the surface of the spinning roller, in some applications it may be desirable to provide a coating on the surface of the spinning roller such that the surface energy of the surface of the spinning roller is greater than the surface tension of the low viscosity activator solution.

Depending upon the labeling application, such as with cut-n-stack labels, it may frequently be desirable to have the low viscosity activator solution cover at least a majority of surface area of the label pallet that is contacted by the label. For example, it may be desirable to provide substantially full coverage of the label surface with the spray of activator solution. In other applications, it may be desirable for the low viscosity activator solution to cover less than a majority of the surface area of the label pallet that is contacted by the label, in one of a (i) fixed pattern, such as in an “x” pattern or around the perimeter of a label; (ii) a stripe, such as in roll-fed partial wrap or full wrap applications; and (iii) a repeating pattern, such as a field of dots or stripes or circles.

Another method according to this invention is a method for retrofitting a high viscosity cold glue supply apparatus to continuously supply a low viscosity activator solution to an activatable adhesive on a surface of a label. The method comprises the steps of: (a) installing a fluid manifold adapted to deliver or spray at least one a stream of the low viscosity activator solution on a spinning roller, the low viscosity activator solution having a viscosity in a range of 5 to 1000 centipoise; and (b) providing a supply pump adapted to supply the low viscosity activator solution to an inlet of the fluid manifold at a pressure sufficient to deliver the stream of the low viscosity activator solution to the surface of the spinning roller, a spinning roller adapted to receive the stream of the low viscosity activator solution from the fluid manifold, and a label pallet adapted to transfer a portion of the low viscosity activator solution from the spinning roller to the activatable adhesive on the label.

This invention also includes apparatus for continuously supplying a low viscosity activator solution to an activatable adhesive on a surface of a label for application of a label to a container. The apparatus comprising: (a) a fluid manifold adapted to continuously deliver or spray at least one stream of a low viscosity activator solution; (b) a spinning roller having a spinning roller surface adapted to receive the stream of the low viscosity activator solution; (c) a label pallet having a label pallet surface adapted to transfer a portion of the low viscosity activator solution from the spinning roller surface to the activatable adhesive on the surface of the label.

In one embodiment, the fluid manifold comprises an inlet, a liquid conduit, and at least one discharge port, wherein the at least one discharge port is in fluid communication with the liquid conduit. The inlet and liquid conduit of the manifold may be in any shape suitable to permit flow of the low viscosity activator solution, including, but not limited to a cylindrical shape. The manifold may be construction of materials such as stainless steel, aluminum, materials made of or that include Teflon®, and ultra high molecular weight polymers, including ultra high molecular weight polyethylene.

In other embodiments, the apparatus comprises a supply pump for supplying the low viscosity activator solution to the inlet of the fluid manifold at a pressure sufficient to deliver the stream of the low viscosity activator solution to the surface of the spinning roller. In other embodiments, the liquid conduit and the at least one discharge port of the fluid manifold are structured in combination to continuously deliver or spray the at least one stream of the low viscosity activator solution to the spinning roller at the pressure supplied by the supply pump.

In still other embodiments, the apparatus comprises a doctor blade in contact with an amount of the low viscosity activator solution on the surface of the spinning roller, wherein the doctor blade is adapted to adjust the amount of the low viscosity activator solution on the spinning roller.

In still yet other embodiments, the apparatus comprises a mounting bracket attached to the fluid manifold and adapted to adjustably position the fluid manifold to deliver or spray the at least one stream of the low viscosity activator solution stream on the spinning pallet. The mounting bracket adjustably positions the fluid manifold in at least one of a vertical distance, a horizontal distance, or an angular distance relative to the spinning roller. The fluid manifold may be mounted to a prior art high viscosity adhesive apparatus without substantial modification.

The above-described apparatus, including the fluid manifold, may be used in any of the methods of the present invention.

The invention still further comprising containers that are labeled according to the methods described and claimed herein.

Referring now to the drawings, FIG. 1 illustrates a prior art high viscosity adhesive application apparatus 10 for application of a high viscosity adhesive to a spinning glue roller 26. A high viscosity adhesive, such as a high viscosity cold glue, is supplied from a high viscosity adhesive supply means (not shown) via a pipe 20 to an inlet port 22 that is in fluid communication with a doctor blade 24. The high viscosity adhesive is applied by gravity flow over a spinning glue roller 26. The excess amount of the high viscosity adhesive is removed via doctor blade 24 and the excess flows by gravity flow to drain 28 for recirculation.

Figure 2:
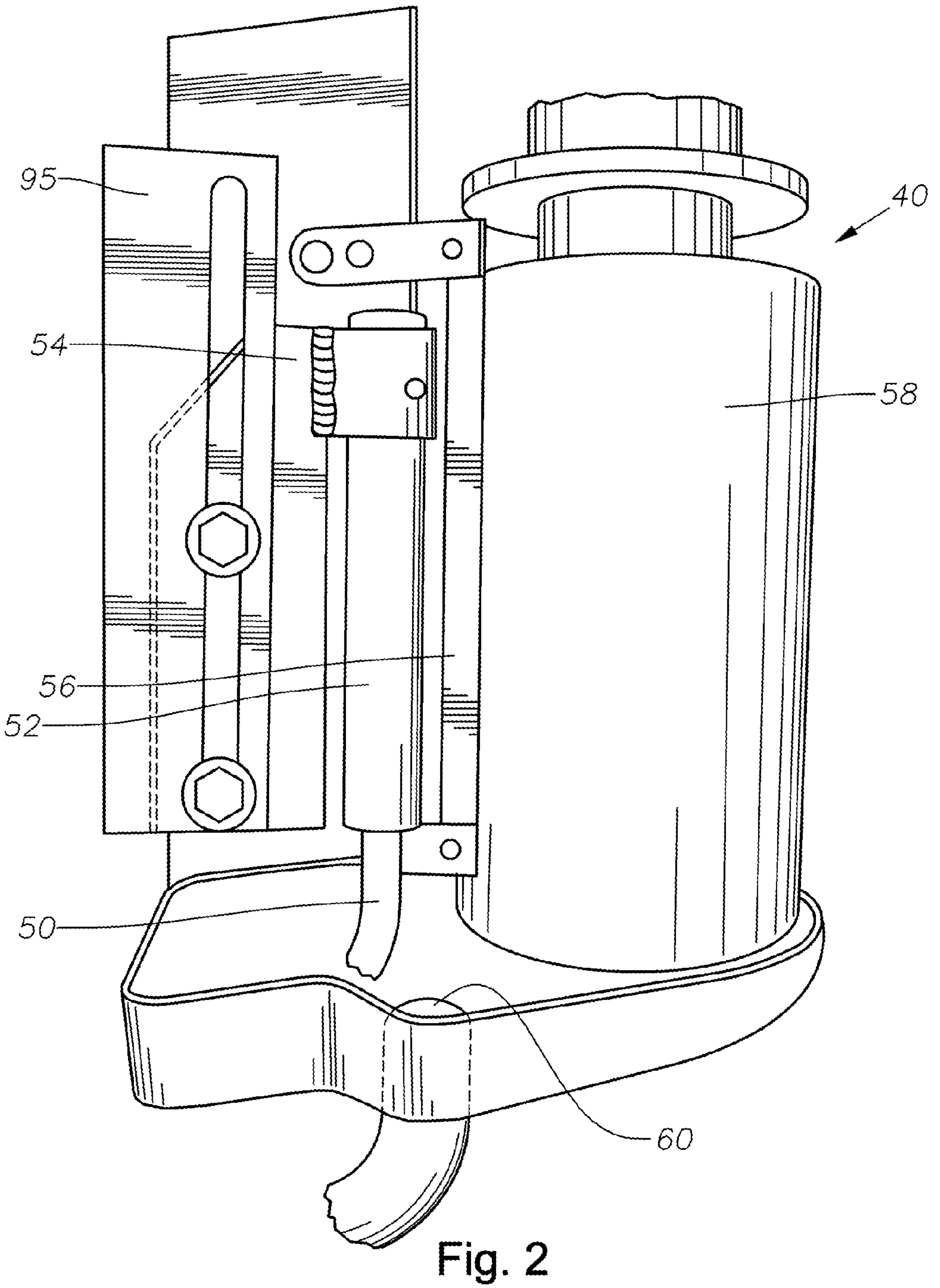
FIG. 2 illustrates an apparatus for supplying a low viscosity activator solution to a spinning roller, of an embodiment of the present invention.

FIG. 2 illustrates an embodiment of an assembly 40 for supplying a low viscosity activator solution to a spinning roller via fluid manifold 52 of the present invention. Assembly 40 includes a storage tank for supply of a low viscosity activator solution (not shown) or activator solution source reservoir (not shown), for containing a low viscosity activator solution to be delivered to inlet 50 of fluid manifold 52. Assembly 40 may also include a system or devices for conveying the low viscosity activator solution from a tank to fluid manifold 52, which may include, for example, one or more of a supply pump, an air blower, a compressor, tubing, pipe, and a hose. The type of supply pump is not particularly limited, and may be a piston pump, a peristaltic pump or any pump suitable to supply the low viscosity activator solution to the inlet 50 of fluid manifold 52 for continuous delivery or spray of at least one stream of the low viscosity activator solution to the spinning roller 58.

In operation, the fluid manifold 52 delivers or sprays at least one stream, preferably a plurality of streams, of the low viscosity activator solution to at least a portion of spinning roller 58. The low viscosity activator solution substantially wets-out the surface of the spinning roller 58. The amount of the low viscosity activator solution on the spinning roller 58 is adjusted and controlled via doctor blade 56 and the excess low viscosity activator solution flows by gravity to drain 60 for recirculation. The fluid manifold 52 is attached to mounting bracket 54 by suitable attachment means, such as but not limited to one or more bolts or screws. The mounting bracket 54 is attached to support member 95 of assembly 40. The spinning roller 58 may be the same as the prior art spinning glue roller 26 of FIG. 1. The doctor blade 58 may be the same as doctor blade 24 of FIG. 1.

The composition of the low viscosity activator solution which may be sprayed by fluid manifold 52 is not particularly limited. For example, the low viscosity activator solution may contain water or any chemical fluid which serves to activate the activatable adhesive of a label. An activatable adhesive may comprise an exterior layer that is formed as an integral part of a label or label material, such as a coextruded layer of a multilayer polymer film. Alternatively, such activatable adhesive may comprise a layer that is coated or applied to a label or label material, such as a coating or laminated layer.

In certain embodiments, the low viscosity activator solution may contain a mixture of water and another additive, such as at least one additive selected from the group comprising adhesives, crosslinking agents, surfactants, and thickening agents. An adhesive which may form a part of the low viscosity activator solution is not particularly limited and may include, for example, casein, starch or a synthetic adhesive. A crosslinking agent which may form a part of the low viscosity activator solution is not particularly limited and may include, for example, a metal-based crosslinker, such as ammonium zinc carbonate, a borate, or an aziridine. A thickening agent for increasing the viscosity of the low viscosity activator solution is not particularly limited and may include, for example, Laponite (a synthetic clay), other clay and clay-like materials, or an aluminum silicate. In other embodiments, the low viscosity activator solution may be a non-aqueous, solvent-based solution, such as, for example, an organic solvent-based solution. In some preferred embodiments, the low viscosity activator solution contains water, and in certain particularly preferred embodiments, the low viscosity activator solution consists of water or consists of water and a surfactant.

Figures 3, 4A, 4B:
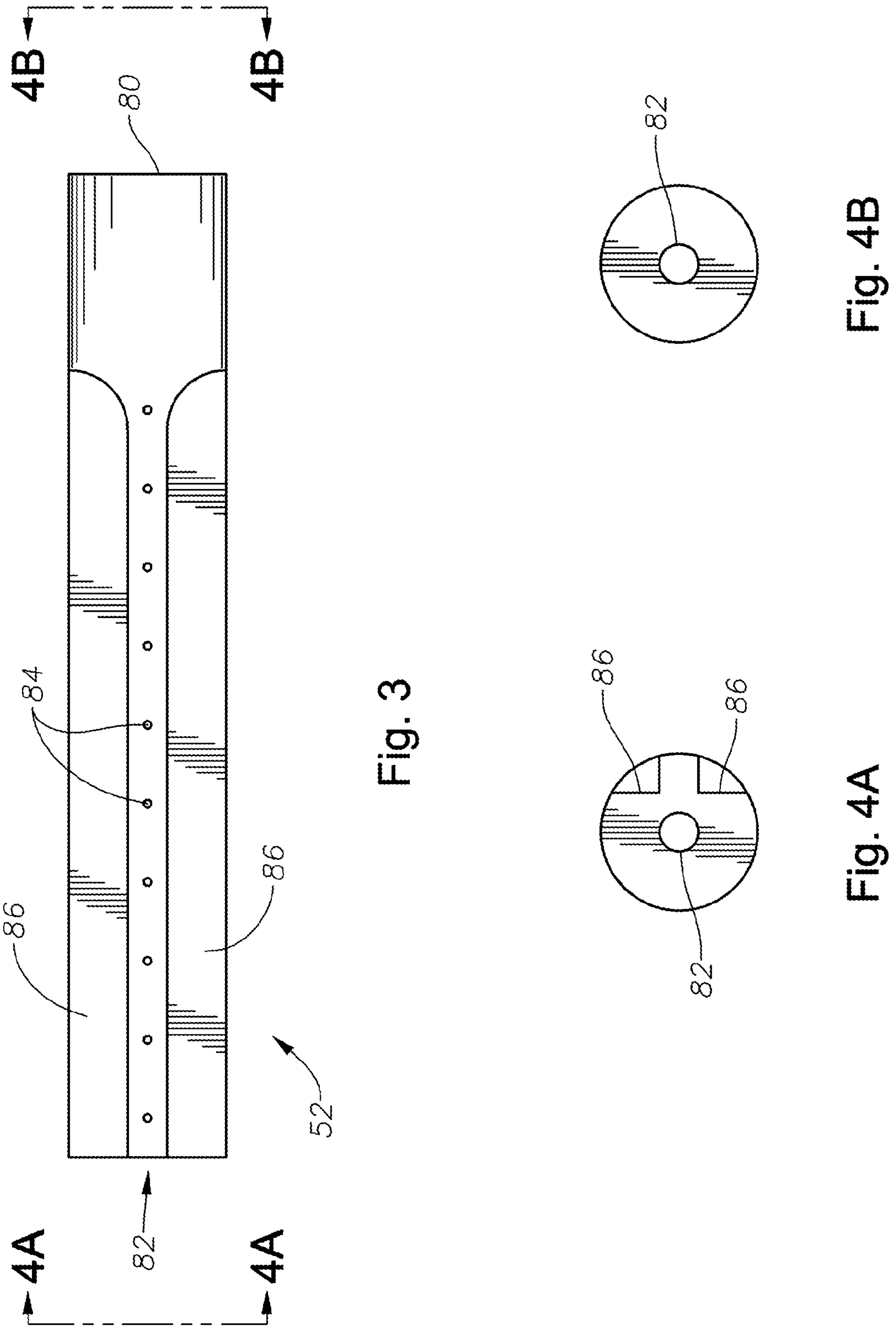
FIG. 3 is a front view of a fluid manifold of an embodiment of the present invention.
FIGS. 4A and 4B are left and right side views, respectively, of the fluid manifold of FIG. 3, of an embodiment of the present invention.

Referring to FIG. 3, an embodiment of fluid manifold 52 is illustrated. Fluid manifold 52 has an inlet 80 in fluid communication with a liquid conduit 82. The liquid conduit 82 is in fluid communication with at least one discharge port, preferably a plurality of discharge ports 84.

Fluid manifold 52 may comprise at least one discharge port, preferably a plurality of discharge ports 54, including, but not limited to, nozzles and/or nozzle jets to apply the spray in the desired fashion. Selection of the type of discharge port depends upon numerous factors, including activator solution composition, the pressures and hydraulics involved, and the level of activator solution desired or required in the particular labeling application.

The type of discharge port 84 which may be used as fluid manifold 52 is not particularly limited. Fluid manifold 52 may, in certain embodiments, include means for reducing the low viscosity activator solution to droplets and/or for directing the low viscosity activator solution to the application point, such as, for example, a nozzle, jet, atomizer, or nebulizer, including electrostatic sprayer technologies, such as may be used with ink jet printers. In preferred embodiments, fluid manifold 52 continuously delivers or sprays a controlled, metered layer of activator solution directly onto the exposed surface of the spinning roller 58. Fluid manifold 52 may enable assembly 40 to continuously deliver or spray at least one stream of the low viscosity activator solution to the surface of the spinning roller 58 with an even wet-out.

On either side of the discharge ports 84 are grooves 86 that may be attached to a mounting bracket (not shown).

FIG. 4A is a left view of fluid manifold 52 and shows liquid conduit 82 and grooves 86.

FIG. 4B is a right view of fluid manifold 52 and shows liquid conduit 82.

Figure 4C:
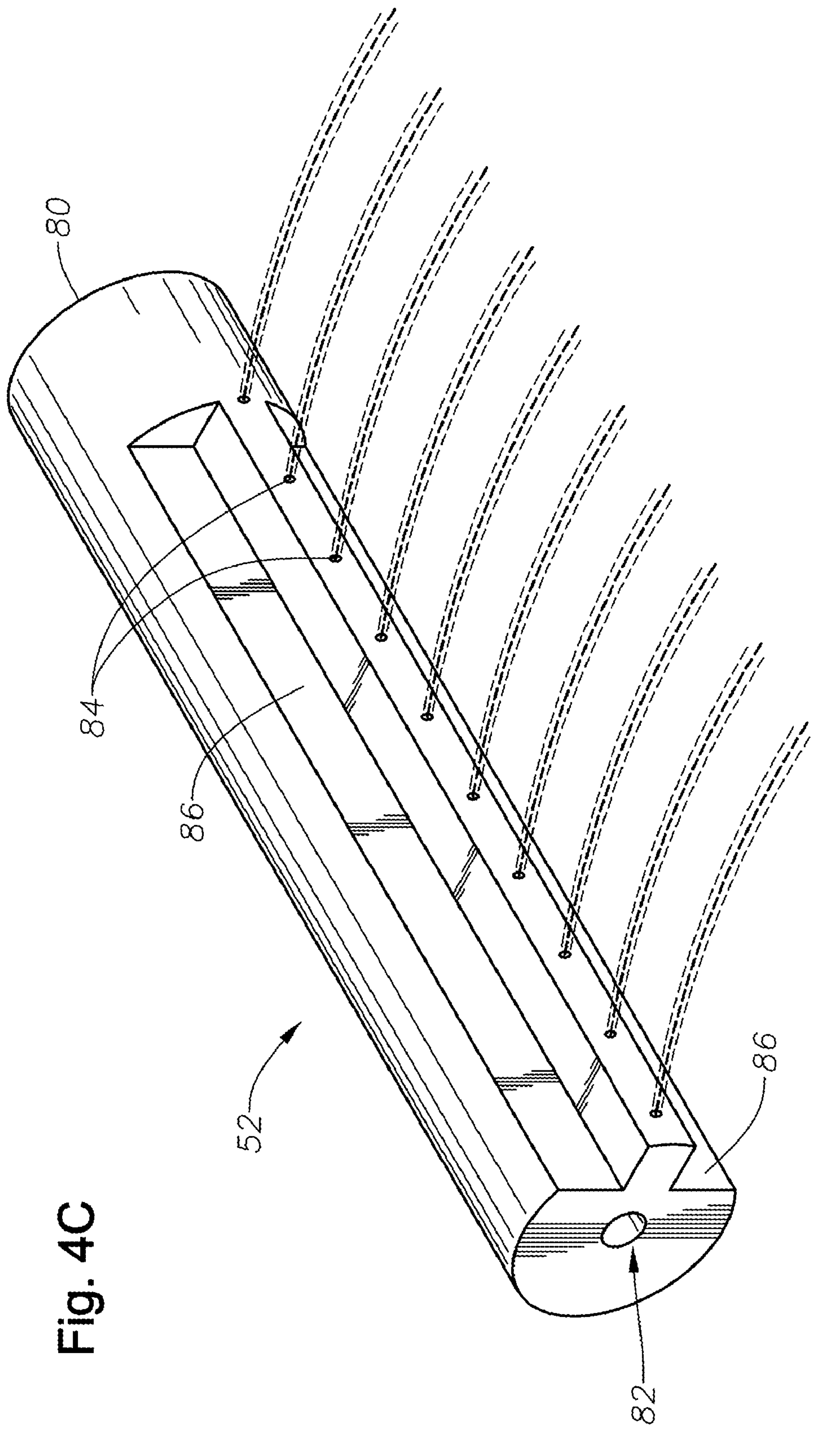
FIG. 4C illustrates the operation of the fluid manifold of FIG. 3 of an embodiment of the present invention, supplying a low viscosity activator solution.

FIG. 4C illustrates the operation of the fluid manifold of FIG. 3 of an embodiment of the present invention, supplying a low viscosity activator solution.

Figure 5B:
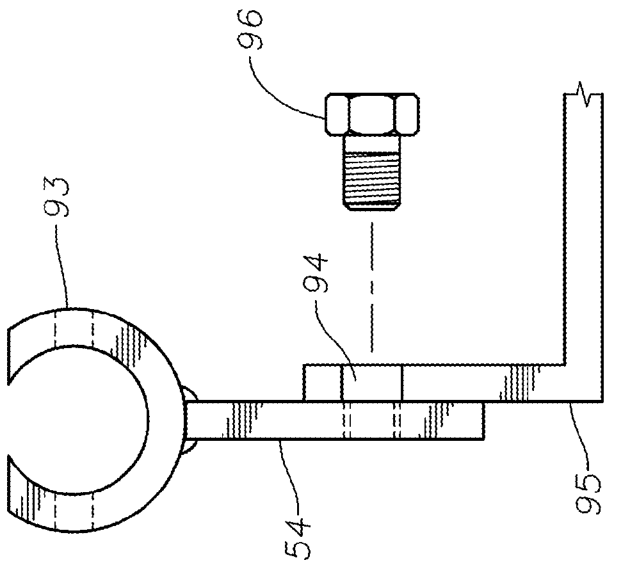
FIGS. 5A and 5B are side and top views, respectively, of the mounting bracket of an embodiment, of the present invention.
Figure 5A:
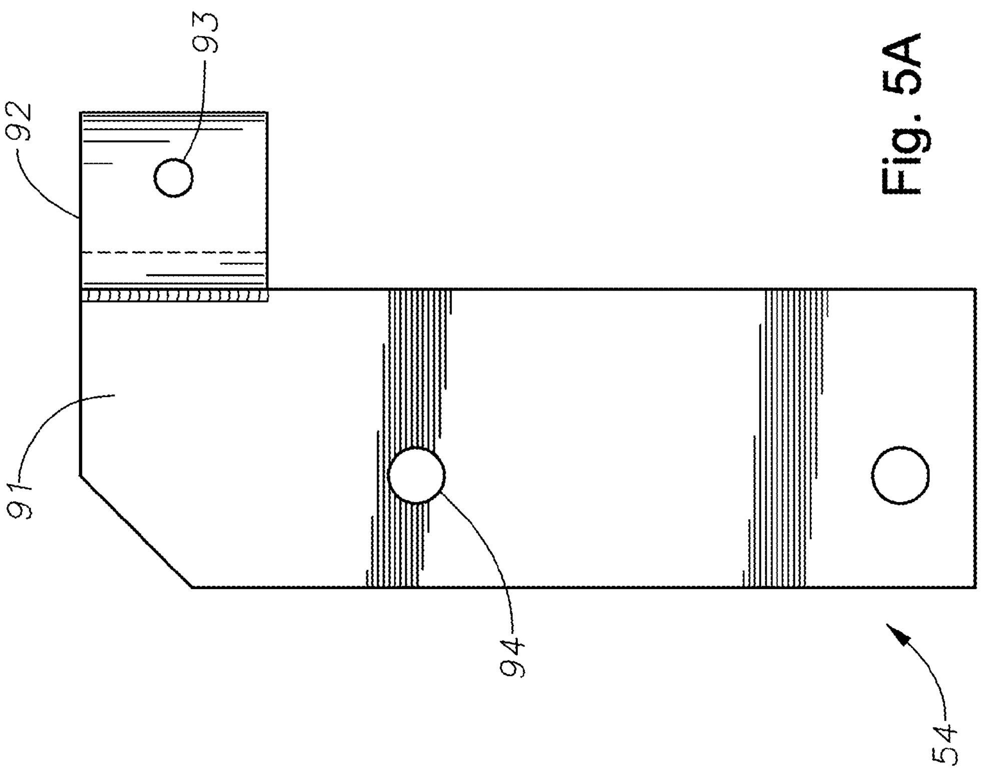

FIG. 5A illustrates a side view of mounting bracket 54 for adjustably positioning and securing fluid manifold 52. Mounting bracket 54 includes a vertical member 91 with receiving means 92 and securing means 93 to receive and secure fluid manifold 52. Mounting bracket 54 has mounting means 94, such as mounting holes, to receive means (not shown) to secure the mounting bracket 54 to assembly 40.

FIG. 5B illustrates a top view of mounting bracket 54 attached to support member 95 via attachment means 96, such as a screw or bolt, and using means 94.

Figure 6A:
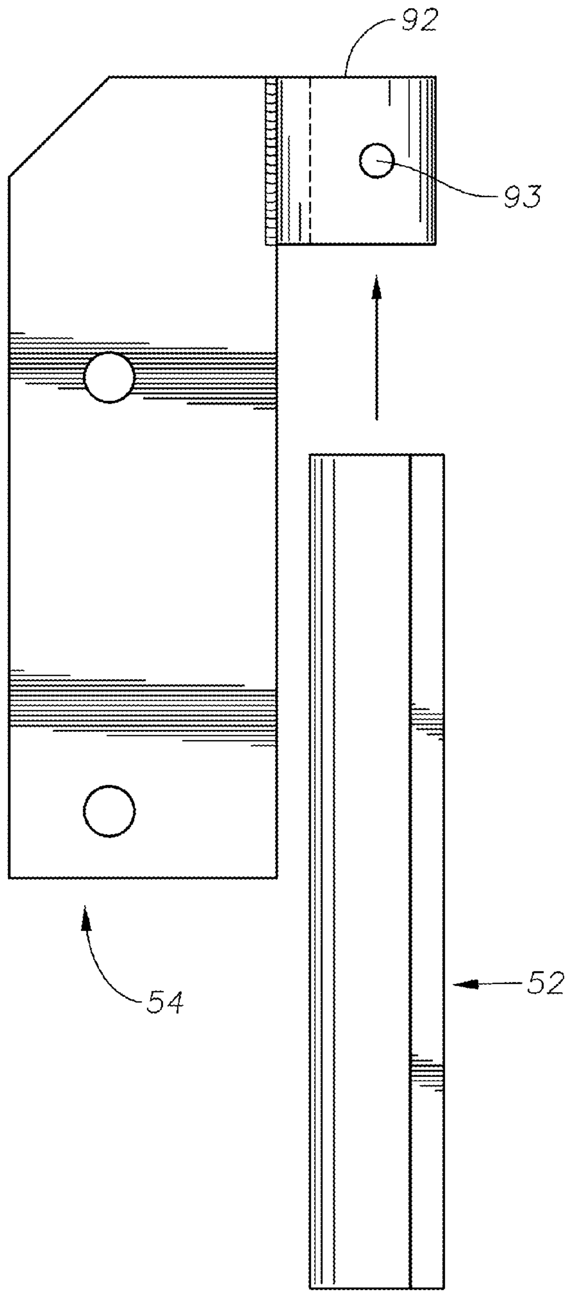
FIGS. 6A and 6B are side and top views, respectively of the mounting bracket and the fluid manifold, of an embodiment of the present invention.

FIG. 6A illustrates a side view of mounting bracket 54 as it receives fluid manifold 52 in receiving means 92.

Figure 6B:
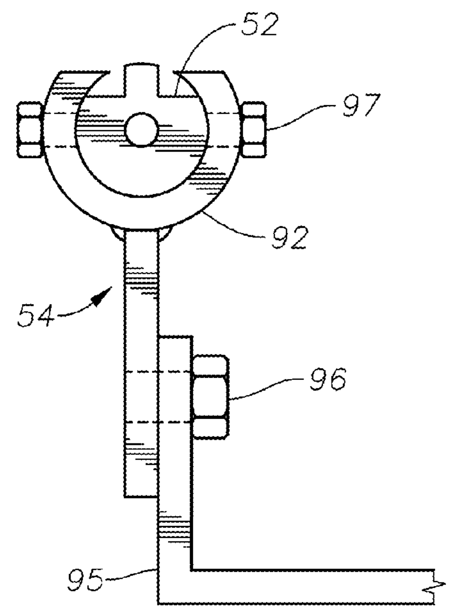

FIG. 6B illustrates a top view of mounting bracket 54 in which fluid manifold 52 is secured in receiving means 92 via attachment means 97 through securing means 93, as shown in FIG. 6A.

Figure 7:
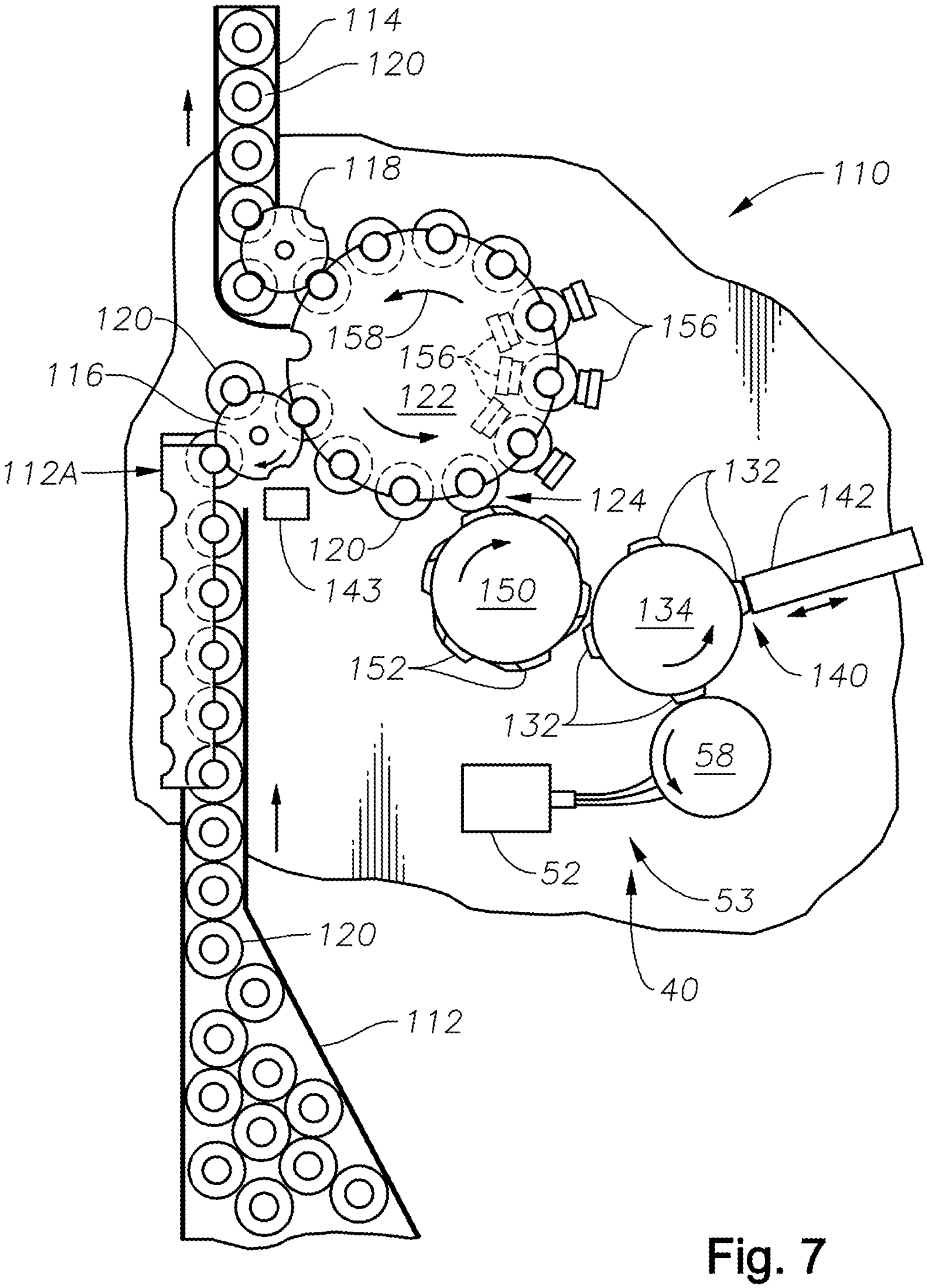
FIG. 7 is a schematic, top view, illustrating a cut-and-stack labeling apparatus, of an embodiment of the present invention.

FIG. 7 illustrates an example of an apparatus, shown generally at 110, for continuously applying labels to containers in a "straight-through" rotary system employing cut-and-stack labels. Other cut-and-stack label systems may be used, including but not limited to, parallel cut-and-stack rotary label systems, right-angle cut-and-stack rotary label systems, and cut-and-stack label systems which do not require the use of a rotating turret to handle the bottles, or other containers, during the label application operation.

There may be provided an inlet conveyor section 112, an outlet conveyor section 114 and rotating bottle-transfer members 116 and 118 for transferring bottles 120 from inlet conveyor section 112 to a rotating turret 122, and for removing bottles from rotating turret 122 to outlet conveyor section 114, respectively, after the bottles have been directed through a label applicator station 124.

In FIG. 7, each of the label pallets 132 may be mounted on a rotating support member 134. Alternatively, the label pallets may be mounted on a support member that moves back and forth in an oscillating motion. Still other embodiments may provide oscillating components, such as label pallet 132 in a rotating member 134. Oscillatory motion may be provided by, for example, a cam-drive arrangement. Such a cam-drive arrangement is employed in many conventional cut-and-stack labeling systems, such as those manufactured by, for example, KRONES AG in West Germany or KRONES, Inc. in Franklin, Wis. (Krones AG and Krones, Inc. hereinafter collectively being referred to as "KRONES").

In assembly 40, the fluid manifold 52 continuously delivers or sprays at least one stream 53, preferably a plurality of streams, of the low viscosity activator solution to at least a portion of spinning roller 58. As each label pallet 132 is moved past (such as by rotation of support member 134) spinning roller 58 having low viscosity activator solution thereon, the low viscosity activator solution may be transferred by contact, preferably uniformly, onto each label pallet 132.

Label pallets 132 may be made of any suitable material. In certain embodiments, label pallets 132 may be made of a rubber, a foamed rubber, a plastic, such as, for example, a photo polymer of the type used in a flexographic system, or a metal, such as, for example, aluminum. For example, in particular embodiments, label pallets 132 may be formed of a smooth surface elastomer (natural or synthetic) having a Shore A hardness in the range of from about 50 to about 90. A labeling apparatus may comprise a single label pallet or multiple label pallets.

Label pallets 132, with the low viscosity activator solution thereon, may be directed sequentially by rotating reciprocating member 134 to a transfer station 140. Transfer station 140 may include a label dispenser, such as a magazine type dispenser 142 containing a stack of cut labels (not shown) therein. Magazine 142 may be mounted for linear reciprocating motion toward and away from the exposed surface of the label pallets, respectively.

The composition and structure of labels for use in the present invention is not particularly limited. For example, the labels may be paper or plastic/polymeric. The plastic labels may be transparent or opaque. The labels may be monolayered or multilayered. The labels may include a metallized layer. In certain preferred embodiments, one or more layers of the label may include at least one of, for example, polypropylene, polyethylene, and polyethylene terephthalate (PET).

The labels include an activatable coating or layer as an outermost surface of the labels. In magazine 142, the labels may be arranged such that, for the first or exposed label in the magazine, the activatable coating or layer is preferably the exposed surface of the label. The activatable coating or layer is a potentially adhesive coating or layer that may be substantially not adhesive prior to being activated by the low viscosity activator solution, e.g., when moistened or wet through application of the low viscosity activator solution. The phrase "substantially not adhesive" refers to the fact that the activatable coating or layer, if not activated, may not adhere to a label pallet or container in a manner permitting effective operation of a method or apparatus for continuously applying labels to a container.

The composition of the activatable coating or layer is not particularly limited. In some embodiments, the activatable coating or layer may include at least one of, for example, animal glue, a water-based casein adhesive, or a water-based starch adhesive. In certain preferred embodiments, the activatable coating or layer includes an animal acrylic-based aqueous solution that has been dried.

In certain embodiments, a label may include a printable coating or layer on a side of the label opposite the activatable coating or layer in order to provide the label with a printable outer surface. In other embodiments, a label may include an adhesion-enhancing coating or layer as an intermediate, or tie, layer between the base film of the label and the activatable coating or layer. The label may also include an antiblock agent or particulate to reduce label blocking with adjacent labels and feeding equipment.

The reciprocating movement of magazine 142 and/or the label pallet 132 may be controlled, in some embodiments, by a conventional photo detection system 143, (see FIG. 7) which may be positioned to detect the presence of a container, a label, a sprayer, or a pallet at a specified location, preferably at the downstream end of a helical feed roll 112A of inlet conveyor 112. If a container is detected at the specified location of inlet conveyor 112, the magazine 142 may be moved into, or may be maintained in, a forward position for permitting a desired label pallet 132 to engage and remove the exposed label from the stack of cut labels retained in the magazine. The desired label pallet 132 may be the one that receives a label that ultimately will be aligned with the detected container when that container is in label applicator station 124 of rotating turret 122, to thereby transfer, or apply, the label to the container. If a container is not detected at the specified location by photo detection system 143, then magazine 142 may be retracted to preclude a label pallet 132 from engaging and receiving the exposed label in magazine 142, which label ultimately may have been directed to an empty container position at label applicator station 124 on turret 122 resulting from a container not being in the specified location being monitored by the photo detection system.

Referring to FIG. 7, label pallets 132, with the labels thereon, may be rotated by support member 134 to a transfer assembly shown generally at 150. Transfer assembly 150 may include, for example, a plurality of cam-operated gripping members 152 disposed about the periphery thereof for engaging labels carried by label pallets 132 and transferring the labels to transfer assembly 150. Transfer assembly 150 may be generally of any functionally operative design. For example, gripping members 152 may engage labels carried on label pallets 132. During transfer of the labels to transfer assembly 150, label pallets 132 may be oscillated.

Referring again specifically to an embodiment of an apparatus illustrated in FIG. 7, each of labels containing the activated coating or layer thereon may be rotated into a position for engaging the periphery of a container 120 carried on turret 122 in label applicator station 124. The spacing of the labels on transfer assembly 150 and the speed of rotation of the transfer assembly may be timed with the speed of rotation of rotating turret 122 such that each label carried on transfer assembly 150 may be sequentially directed into engagement with an adjacent bottle carried on the rotating turret. Moreover, photo detection system 143, if present, may prevent a label from being carried to label applicator station 124 when a bottle for receiving such label is missing from that station.

Still referring to FIG. 7, each of labels may be applied at, for example, its midline to the periphery of an adjacent container 120, thereby providing outer wings extending in opposed directions from the center line of the label, which is adhered to the bottle. The specific manner of applying the labels to the containers is not particularly limited, however, and labels may be applied to a surface of a bottle in other ways.

After a label initially is adhered to a bottle 120 in label applicator station 124, rotating turret 122 may direct each bottle, with the label attached thereto, through a roller station containing at least one roller or, in preferred embodiments, a series of rollers 156. As bottles 120 are directed through the series of rollers 156, bottles 120 may also oscillate back and forth about their central axis to thereby create an interaction between the bottles, labels and bottle rollers to ensure further intimate contact between label and container. For example, in one embodiment, a first bottle roller may apply pressure to a label on a container beginning at the middle of the label and continuing to a first outside edge of the label. A next bottle roller in the bottle roller station may apply pressure to the label beginning at the middle of the label and continuing to a second outside edge of the label. In certain embodiments, the bottle rollers of the bottle roller station may be timed to a computer.

Advantageously, the labels may be smoothed down and any trapped air may be squeezed out by passing the bottles through a label smoother station, including components such as a smoother roller, an air knife, or a wiper blade. Although the smoother station may be located at any point after the label application section, the smoother station preferably may be located after the label application section and before outlet 114 of the container handling device, as shown in FIG. 7.

Smoothing brushes may also be used supplemental to or as an alternative to the smoothing station. In preferred embodiments, however, the smoothing station is used in the absence of smoothing brushes. Some smoothing brushes may be too harsh for certain film label embodiments and may scratch the film surface. Smoothing brushes may also not smooth in a continuous pattern. If smoothing brushes are used, the brush bristle length, brush stiffness, and brush array (the orientation of the brushes to the label position) may each be adjusted to maximize smoothing while minimizing damage to the label. In certain embodiments using smoothing brushes, a first pair of brushes may be focused on the center of the label and successive pairs of brushes may proceed to the edges of the label. Still referring to FIG. 7, bottles 120 may be carried by rotating turret 122 in the direction of arrow 158 to bottle-transfer member 118, at which point bottles 120 may be transferred to outlet conveyor section 114 for subsequent packaging.

Further embodiments are within the scope of the following claims.

What is claimed is:

1. A method for applying a clear label to a container, the label having an activatable adhesive on a surface thereof, the activatable adhesive activated by a low viscosity activator solution, the method consisting essentially of the steps of:

(a) providing a high viscosity hot or cold glue supply apparatus and retrofitting that with an apparatus to continuously supply a low viscosity activator solution;

(b) supplying the low viscosity activator solution to a fluid manifold;

(c) continuously spraying at least one stream of the low viscosity activator solution from the fluid manifold to at least a portion of a surface of a spinning roller;

(d) adjusting an amount of the low viscosity activator solution on the spinning roller with a doctor blade;

(e) transferring at least a portion of the adjusted low viscosity activator solution from the surface of the spinning roller to a label pallet not having a label thereon;

(f) transferring a label onto the label pallet, thereby contacting the activatable adhesive on the label with the low viscosity activator solution on the label pallet to activate the activatable adhesive on the label and produce an adhesive label;

(g) transferring the adhesive label onto a transfer assembly, having the adhesive side of the label facing away from the label pallet; and (h) thereafter, applying the adhesive label from the transfer assembly to the container.

2. The method of claim 1, wherein the fluid manifold comprising an inlet, a liquid conduit and at least one discharge port, wherein the discharge port is in fluid communication with the liquid conduit and the inlet.

3. The method of claim 2, wherein the low viscosity activator solution is supplied to the inlet of the fluid manifold by a supply pump at a pressure sufficient to deliver the stream of the low viscosity activator solution to the surface of the spinning roller.

4. The method of claim 3, wherein the liquid conduit and the at least one discharge port are structured in combination to deliver the at least one stream of the low viscosity activator solution to the spinning roller at the pressure supplied by the supply pump.

5. The method of claim 1 after transferring step (e), further comprising the step of positioning the label in a label magazine so that the low viscosity activatable adhesive may receive the low viscosity activator solution from the label pallet.

6. The method of claim 1, wherein the label comprising at least one of a polymeric film and a paper.

7. The method of claim 1, wherein the low viscosity activator solution has a viscosity in a range of about 5 to 1000 centipoise.

* * * * *